(12) United States Patent
Choi et al.

(10) Patent No.: US 7,481,071 B2
(45) Date of Patent: Jan. 27, 2009

(54) COOLING/HEATING APPARATUS USING COGENERATION SYSTEM

(75) Inventors: Chang Min Choi, Seoul (KR); Seung Tak Kang, Seoul (KR); Won Jae Choi, Seoul (KR); Hyung Soo Lim, Seoul (KR); Yoon Jei Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 365 days.

(21) Appl. No.: 11/298,518

(22) Filed: Dec. 12, 2005

(65) Prior Publication Data

US 2006/0144067 A1 Jul. 6, 2006

(30) Foreign Application Priority Data

Dec. 13, 2004 (KR) ............... 10-2004-0105034

(51) Int. Cl.
*F25B 27/02* (2006.01)
(52) U.S. Cl. .................................. 62/238.7
(58) Field of Classification Search ...... 62/238.6–238.7
See application file for complete search history.

(56) References Cited

U.S. PATENT DOCUMENTS

| | | | | |
|---|---|---|---|---|
| 4,321,797 A | * | 3/1982 | Yaeger et al. ............ | 62/79 |
| 5,729,985 A | * | 3/1998 | Yoshihara et al. ......... | 62/81 |
| 6,543,531 B1 | * | 4/2003 | Casar et al. ............ | 165/202 |
| 6,708,511 B2 | * | 3/2004 | Martin .................. | 62/201 |
| 6,807,820 B2 | * | 10/2004 | Aikawa et al. ........... | 62/238.3 |
| 6,865,901 B2 | * | 3/2005 | Horn et al. ............. | 62/238.6 |
| 7,048,044 B2 | * | 5/2006 | Ban et al. .............. | 165/202 |

* cited by examiner

*Primary Examiner*—William E Tapolcai
(74) *Attorney, Agent, or Firm*—Birch, Stewart, Kolasch & Birch, LLP

(57) ABSTRACT

A cooling/heating apparatus using a cogeneration system is disclosed. The cooling/heating apparatus includes a discharge-side refrigerant heating unit which supplies heat of exhaust gas generated from an engine to a discharge-side refrigerant line connected to a compressor included in a cooling/heating unit, a suction-side refrigerant heating unit which supplies heat of cooling water used to cool the engine and the heat of the exhaust gas to a suction-side refrigerant line connected to the compressor, a discharge-side refrigerant temperature sensor which senses a temperature of a refrigerant passing through the discharge-side refrigerant line, and a bypass unit which bypasses the exhaust gas heat supplied to the discharge-side refrigerant line via the discharge-side refrigerant heating unit when the refrigerant temperature sensed by the discharge-side refrigerant temperature sensor is not lower than a predetermined temperature, to cut off the supply of the exhaust gas heat or to adjust an amount of the supplied exhaust gas heat. The exhaust gas heat and cooling water heat are appropriately distributed to both the suction and discharge sides of the compressor, so that it is possible to achieve an enhancement in heating performance and an enhancement in system efficiency.

15 Claims, 7 Drawing Sheets

COOLING/HEATING APPARATUS USING COGENERATION SYSTEM

BACKGROUND OF THE INVENTION

1. Field of the Invention

The present invention relates to a cogeneration system in which both the electricity and waste heat generated from an engine are used, and, more particularly, to a cooling/heating apparatus using a cogeneration system in which waste heat generated from an engine during a heating operation is supplied to both the suction and discharge sides of a compressor, to achieve an enhancement in heating performance.

2. Description of the Related Art

In general, cogeneration systems are adapted to generate both electricity and heat from a single energy source.

Such a cogeneration system can recover heat of exhaust gas or waste heat of cooling water generated from an engine or turbine during an electricity generation operation, so that the cogeneration system can achieve an increase in energy efficiency of 70 to 80% over other systems. By virtue of such an advantage, the cogeneration system has recently been highlighted as an electricity and heat supply source for buildings. In particular, the cogeneration system exhibits highly-efficient energy utilization in that the recovered waste heat is mainly used to heat/cool a confined space and to heat water.

FIG. 1 is a schematic configuration diagram illustrating a heating/cooling apparatus using a conventional cogeneration system.

As shown in FIG. 1, the conventional cogeneration system includes a gas engine 1, and a generator 3, which is driven by a driving force outputted from the gas engine 1, to generate electricity. The electricity generated from the generator 3 is used in a variety of devices including a cooling/heating unit 20, illumination devices, and other electrical products.

Waste heat generated from the gas engine 1, that is, heat of cooling water generated when the cooling water cools the gas engine 1 and heat of exhaust gas generated from the gas engine 1, is used during a heating operation of the cooling/heating unit 20.

Here, the cooling/heating unit 20 is of a heat pump type so that the cooling/heating unit 20 not only can be used as a cooling unit, but also can be used as a heating unit in a state in which the refrigerant flow direction in a refrigerant cycle established in the cooling/heating unit 20 is reversed. As in a general heat pump type configuration, the cooling/heating unit 20 includes a compressor 21, a 4-way valve 23, an outdoor heat exchanger 25, an outdoor fan 26, an expansion device 27, and an indoor heat exchanger 29.

In particular, an air pre-heating heat exchanger 30 is arranged at the side of the outdoor heat exchanger 25 to preheat air passing around the outdoor heat exchanger 25 during a heating operation of the cooling/heating unit 20, using the waste heat of the gas engine 1.

In order to supply the waste heat to the cooling/heating unit 20, the cogeneration system also includes a cooling water heat exchanger 5 to recover the heat of the cooling water used to cool the gas engine 1, and an exhaust gas heat exchanger 9 arranged at an exhaust conduit 7 to recover the heat of the exhaust gas.

The cooling water heat exchanger 5 and exhaust gas heat exchanger 9 are connected to the air pre-heating heat exchanger 30 of the cooling/heating unit 20 by a heat transfer line 11, through which a heat transfer medium flows, so as to supply waste heat to the air pre-heating heat exchanger 30 during the heating operation of the cooling/heating unit 20. Thus, the cogeneration system recovers engine heat and exhaust gas heat, pre-heats outdoor air through the air pre-heating heat exchanger 30, using the recovered heat, and causes the pre-heated air to heat-exchange with the outdoor heat exchanger 25, thereby preventing a degradation in heating performance of the cooling/heating unit 20, which may occur when the temperature of the outdoor air is low.

When the cooling/heating unit 20 operates in cooling mode, the flow path of the heat transfer medium is changed to communicate with a radiating line 13, which is connected to the heat transfer line 11, because it is unnecessary to supply waste heat. In this case, the waste heat is discharged to the atmosphere through a radiator 17, which includes a heat exchanger 15 and a radiator fan 16, or is supplied to and used in a water heater, a hot water supplier, or other systems.

In FIG. 1, reference character P designates pumps, each serving to force the heat transfer medium to flow through an associated portion of the heat transfer line 11, and reference character V designates valves, each serving to switch the flow path of the heat transfer medium between the heat transfer line 11 and the radiating line 13.

In the cooling/heating apparatus using the above-mentioned conventional cogeneration system, however, there is a problem in that it is impossible to achieve an enhancement in heating performance because the waste heat generated from the gas engine 1 is supplied only to the air pre-heating heat exchanger 30 to preheat the outdoor heat exchanger 25.

SUMMARY OF THE INVENTION

The present invention has been made in view of the above-mentioned problem, and it is an object of the invention to provide a cooling/heating apparatus using a cogeneration system in which heat of exhaust gas generated from an engine and heat of cooling water are appropriately distributed to both the suction and discharge sides of a compressor during a heating operation, thereby achieving an enhancement in heating performance and an enhancement in system efficiency.

In accordance with one aspect, the present invention provides a cooling/heating apparatus using a cogeneration system comprising: an engine which drives a generator to generate electricity; a cooling/heating unit which comprises at least one compressor, a 4-way valve, an outdoor heat exchanger, an expansion device, and an indoor heat exchanger, to establish a heat pump type refrigerant cycle; and a discharge-side refrigerant heating unit which supplies heat of exhaust gas generated from the engine to a discharge-side refrigerant line connected to the compressor; a discharge-side refrigerant temperature sensor which senses a temperature of a refrigerant passing through the discharge-side refrigerant line; and a bypass unit which bypasses the exhaust gas heat supplied to the discharge-side refrigerant line via the discharge-side refrigerant heating unit when the refrigerant temperature sensed by the discharge-side refrigerant temperature sensor is not lower than a predetermined temperature, to cut off the supply of the exhaust gas heat or to adjust an amount of the supplied exhaust gas heat.

The discharge-side refrigerant heating unit may comprises at least one exhaust gas heat exchanger arranged in an exhaust conduit of the engine, to heat-exchange with the exhaust gas flowing through the exhaust conduit, a discharge-side refrigerant heating line which receives heat recovered from the exhaust gas heat exchanger, and a discharge-side refrigerant heating heat exchanger in which heat exchange is performed between the discharge-side refrigerant heating line and the discharge-side refrigerant line.

The at least one exhaust gas heat exchanger may comprise a first exhaust gas heat exchanger arranged in the exhaust conduit of the engine, and a second exhaust gas heat exchanger arranged in the exhaust conduit of the engine downstream from the first exhaust gas heat exchanger in a flowing direction of the exhaust gas.

The bypass unit may comprise a bypassing and radiating unit which bypasses and outwardly radiates the exhaust gas heat.

The cooling/heating apparatus may further comprise a suction-side refrigerant heating unit which supplies heat of cooling water used to cool the engine and the heat of the exhaust gas generated from the engine to a suction-side refrigerant line connected to the compressor.

The suction-side refrigerant heating unit may comprise a third exhaust gas heat exchanger arranged in the exhaust conduit of the engine, to heat-exchange with the exhaust gas flowing through the exhaust conduit, a cooling water line through which the cooling water flows to absorb heat from the engine, a cooling water heat exchanger through which the cooling water line extends, a suction-side refrigerant heating line which receives heat recovered by the third exhaust gas heat exchanger and the cooling water heat exchanger, and a suction-side refrigerant heating heat exchanger in which heat exchange is performed between the suction-side refrigerant heating line and the suction-side refrigerant line.

The bypass unit may bypass the exhaust gas heat through the suction-side refrigerant heating line of the suction-side refrigerant heating unit.

The bypass unit may comprise a bypass line branched from the discharge-side refrigerant heating line and joined to the suction-side refrigerant heating line, and a valve unit arranged at the branching or joining point of the bypass line, to adjust a flow rate of a heat transfer medium flowing through the bypass line in accordance with the refrigerant temperature sensed by the discharge-side refrigerant temperature sensor.

The cooling/heating apparatus may further comprise a radiating unit connected to the suction-side refrigerant heating unit, to adjust an amount of heat supplied to the suction-side refrigerant line or to cut off the supply of the heat.

In accordance with another aspect, the present invention provides a cooling/heating apparatus using a cogeneration system comprising: an engine which drives a generator to generate electricity; a cooling/heating unit which comprises at least one compressor, a 4-way valve, an outdoor heat exchanger, an expansion device, and an indoor heat exchanger, to establish a heat pump type refrigerant cycle; and a discharge-side refrigerant heating unit which supplies heat of exhaust gas generated from the engine to a discharge-side refrigerant line connected to the compressor; a suction-side refrigerant heating unit which supplies heat of cooling water used to cool the engine and the heat of the exhaust gas generated from the engine to a suction-side refrigerant line connected to the compressor; a discharge-side refrigerant temperature sensor which senses a temperature of a refrigerant passing through the discharge-side refrigerant line; and a bypass unit which bypasses the exhaust gas heat supplied to the discharge-side refrigerant line via the discharge-side refrigerant heating unit when the refrigerant temperature sensed by the discharge-side refrigerant temperature sensor is not lower than a predetermined temperature, to cut off the supply of the exhaust gas heat or to adjust an amount of the supplied exhaust gas heat.

The discharge-side refrigerant heating unit may comprise a first exhaust gas heat exchanger arranged in the exhaust conduit of the engine, to heat-exchange with the exhaust gas flowing through the exhaust conduit, and a second exhaust gas heat exchanger arranged in the exhaust conduit of the engine downstream from the first exhaust gas heat exchanger in a flowing direction of the exhaust gas, to heat-exchange with the exhaust gas flowing through the exhaust conduit. The suction-side refrigerant heating unit may comprise a third exhaust gas heat exchanger arranged in the exhaust conduit of the engine downstream from the second exhaust gas heat exchanger in the flowing direction of the exhaust gas, to heat-exchange with the exhaust gas flowing through the exhaust conduit.

The bypass unit may comprise a bypass line branched from a heat transfer line of the discharge-side refrigerant heating unit and joined to a heat transfer line of the suction-side refrigerant heating unit, and a valve unit arranged at the branching or joining point of the bypass line, to adjust a flow rate of a heat transfer medium flowing through the bypass line in accordance with the refrigerant temperature sensed by the discharge-side refrigerant temperature sensor.

The cooling/heating apparatus may further comprise a radiating unit connected to the suction-side refrigerant heating unit, to adjust an amount of heat supplied to the suction-side refrigerant line or to cut off the supply of the heat.

Since the cooling/heating apparatus using the cogeneration system according to the present invention is configured to appropriately distribute heat of exhaust gas generated from an engine and heat of cooling water to both the suction and discharge sides of the compressor during the heating operation, it is possible to achieve an enhancement in heating performance and an enhancement in system efficiency.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, exemplary embodiments of a cooling/heating apparatus using a cogeneration system according to the present invention will be described with reference to the annexed drawings.

Although a number of embodiments may be implemented for the cooling/heating apparatus using the cogeneration system according to the present invention, the following description will be given in conjunction with the most preferable embodiment. Since the basic configuration of the cooling/heating apparatus is the same as that of the above-described conventional cooling/heating apparatus, no detailed description thereof will be given.

Figure 1:
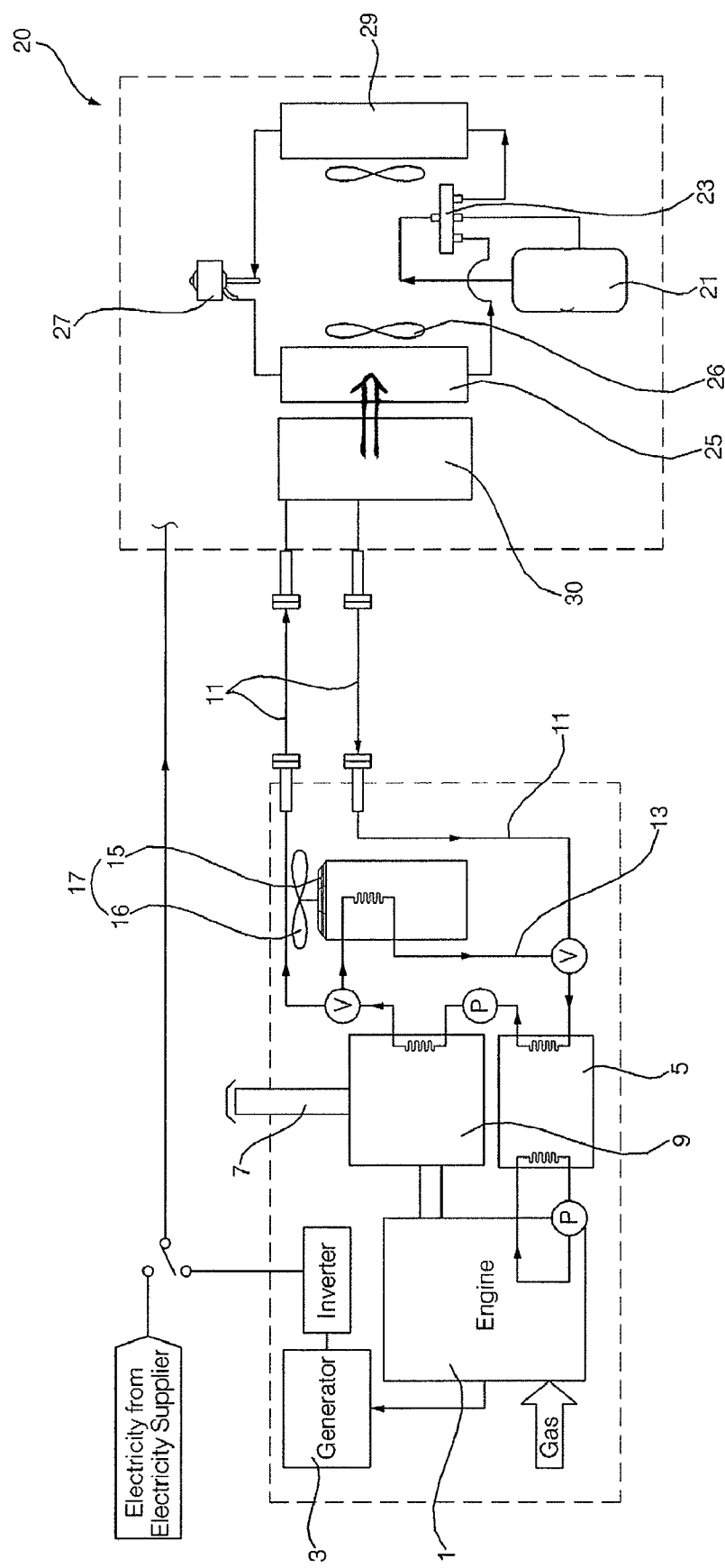
FIG. 1 is a schematic configuration diagram illustrating a conventional cooling/heating apparatus using a cogeneration system.
Figure 2:
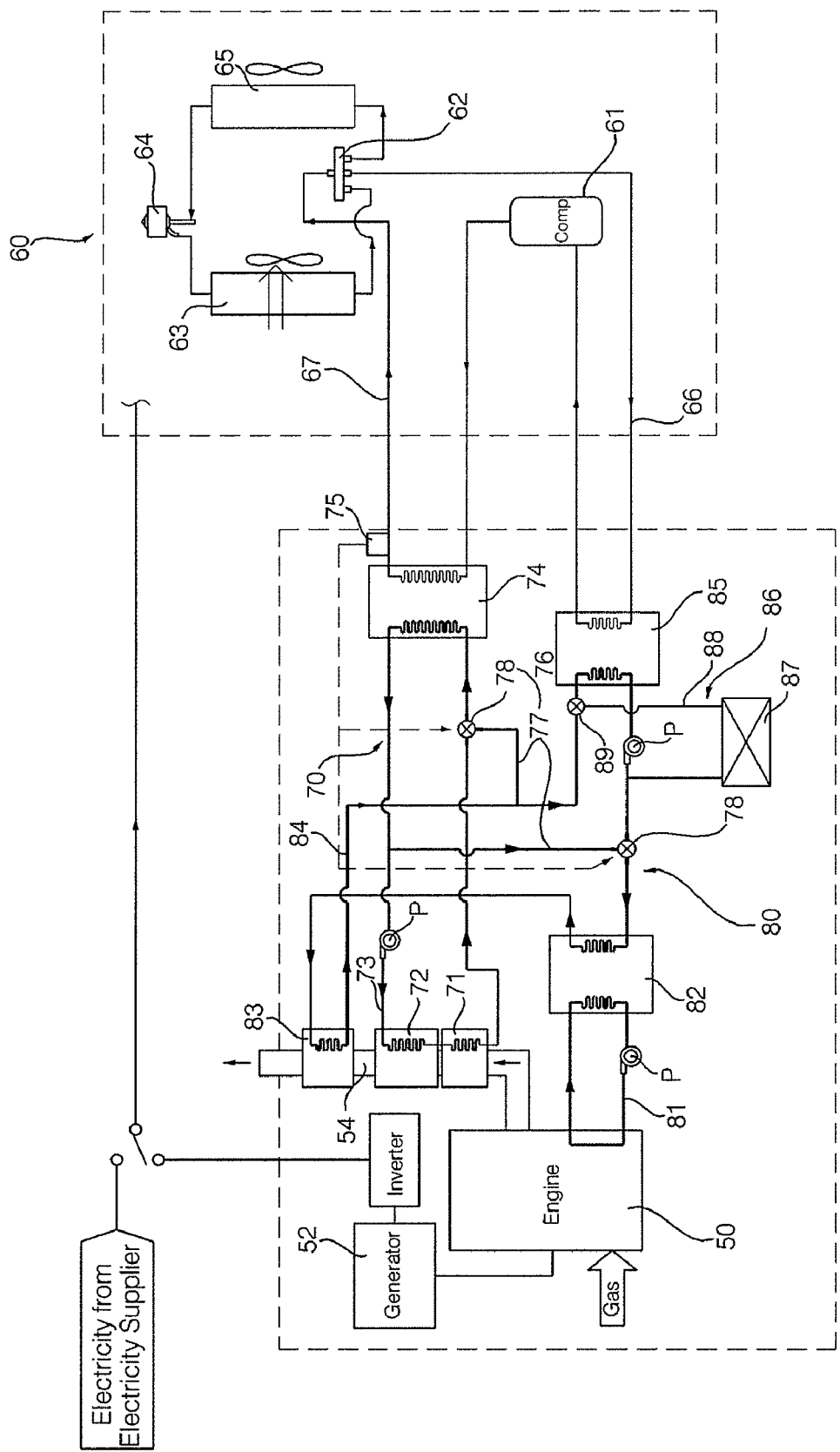
FIG. 2 is a schematic configuration diagram illustrating a cooling/heating apparatus using a cogeneration system according to an exemplary embodiment of the present invention.

FIG. 2 is a schematic configuration diagram illustrating a cooling/heating apparatus using a cogeneration system according to an exemplary embodiment of the present invention.

As shown in FIG. 2, the cogeneration system, which is included in the cooling/heating apparatus according to the illustrated embodiment of the present invention, includes an engine 50, which operates, using fossil fuel such as natural gas or petroleum gas, and a generator 52 to generate electricity, using a driving force of the engine 50. The cogeneration system also includes a first exhaust gas heat exchanger 71, a second exhaust gas heat exchanger 72, and a third exhaust gas heat exchanger 83 which are arranged, in this order, in an exhaust conduit 54, to recover heat of exhaust gas generated from the engine 50. The cogeneration system further includes a cooling water line 81 and a cooling water heat exchanger 82 which recover heat of cooling water used to cool the engine 50.

The cooling/heating apparatus also includes a cooling/heating unit 60 which uses a heat pump type refrigerant cycle using waste heat generated from the engine 50. The cooling/heating unit 60 includes at least one compressor 61, a 4-way valve 62, an outdoor heat exchanger 63, an expansion device 64, and an indoor heat exchanger 65, as in a general heat pump type cooling/heating unit which can be used as both a cooling unit and a heating unit in accordance with reversal of a refrigerant flow in a refrigerant cycle of the cooling/heating unit.

In particular, the cogeneration system includes a refrigerant heating unit adapted to supply heat of cooling water used to cool the engine 50 and heat of exhaust gas generated from the engine 50 to a suction-side refrigerant line 66 connected to the suction side of the compressor 61 in the cooling/heating unit 60, and to supply the heat of the exhaust gas generated from the engine 50 to a discharge-side refrigerant line 67 connected to the discharge side of the compressor 61.

The refrigerant heating unit includes a discharge-side refrigerant heating unit 70 adapted to supply the heat of the exhaust gas discharged from the engine 50 to the discharge-side refrigerant line 67 of the compressor 61 in the cooling/heating unit 60, and a suction-side refrigerant heating unit 80 adapted to supply the heat of the cooling water used to cool the engine 50 and the heat of the exhaust gas discharged from the engine 50 to the suction-side refrigerant line 66 of the compressor 61 in the cooling/heating unit 60.

The first and second exhaust gas heat exchangers 71 and 72, which are arranged in the exhaust conduit 54 to heat-exchange with the exhaust gas flowing through the exhaust conduit 54, are included in the discharge-side refrigerant heating unit 70. The third exhaust gas heat exchanger 83 arranged in the exhaust conduit 54 to heat-exchange with the exhaust gas flowing through the exhaust conduit 54 is included in the suction-side refrigerant heating unit 80. The third exhaust gas heat exchanger 8 is arranged downstream from the second exhaust gas heat exchanger 72 which is arranged downstream from the first exhaust gas heat exchanger 71.

In addition to the first and second exhaust gas heat exchangers 71 and 72, the discharge-side refrigerant heating unit 70 includes a discharge-side refrigerant heating line 73, which receives heat recovered from the first and second exhaust gas heat exchangers 71 and 72, and a discharge-side refrigerant heating heat exchanger 74, in which heat exchange is performed between the discharge-side refrigerant heating line 73 and the discharge-side refrigerant line 67 of the compressor 61.

The suction-side refrigerant heating unit 80 includes the cooling water line 81, through which cooling water flows to absorb heat from the engine 50, and the cooling water heat exchanger 82, through which the cooling water line 81 extends. The suction-side refrigerant heating unit 80 also includes a suction-side refrigerant heating line 84, which receives heat recovered by the third exhaust gas heat exchanger 83 and cooling water heat exchanger 82, and a suction-side refrigerant heating heat exchanger 85, in which heat exchange is performed between the suction-side refrigerant heating line 84 and the suction-side refrigerant line 66 of the compressor 61.

A radiating unit 86 is arranged in the suction-side refrigerant heating line 84. The radiating unit 86 radiates heat to prevent heat from being supplied to the suction-side refrigerant line 66 of the compressor 61 to allow heat to be supplied to the suction-side refrigerant line 66 in an appropriately controlled amount. The radiating unit 86 includes a radiating line 88 connected to the suction-side refrigerant heating line 84 via a 3-way valve 89 to cause a heat transfer medium in the suction-side refrigerant heating line 84 to bypass the suction-side refrigerant heating heat exchanger 85, and a radiating heat exchanger 87 arranged in the radiating line 88.

The radiating heat exchanger 87 may be connected to another system such as a hot water supplier or water heater, in order to use the recovered waste heat.

In particular, in accordance with the illustrated embodiment, the cogeneration system also includes a discharge-side refrigerant temperature sensor 75 adapted to sense the temperature of the refrigerant passing through the discharge-side refrigerant line 67 of the compressor 61. The cogeneration system further includes a bypass unit 76 adapted to bypass a fraction or all of the exhaust gas heat to be supplied to the discharge-side refrigerant line 67 via the discharge-side refrigerant heating unit 70, when the temperature of the refrigerant sensed by the discharge-side refrigerant temperature sensor 75 is not lower than a predetermined temperature.

Preferably, the bypass unit 76 is configured to bypass the exhaust gas heat through the suction-side refrigerant heating line 84 of the suction-side refrigerant heating unit 80.

That is, the bypass unit 76 includes a bypass line 77 branched from the discharge-side refrigerant heating line 73 and joined to the suction-side refrigerant heating line 84, and a valve unit 78 arranged at the branching or joining point of the bypass line 77, and adapted to adjust the flow rate of the heat transfer medium flowing through the bypass line 77 in accordance with the refrigerant temperature sensed by the discharge-side refrigerant temperature sensor 75. The valve unit 78 may comprise a 3-way valve. In the illustrated case, two valve units 78 are arranged at the branching and joining points of the bypass line 77, respectively. For simplicity, the following description will be given only in conjunction with the case in which only one valve unit 78 is arranged.

Figure 7:
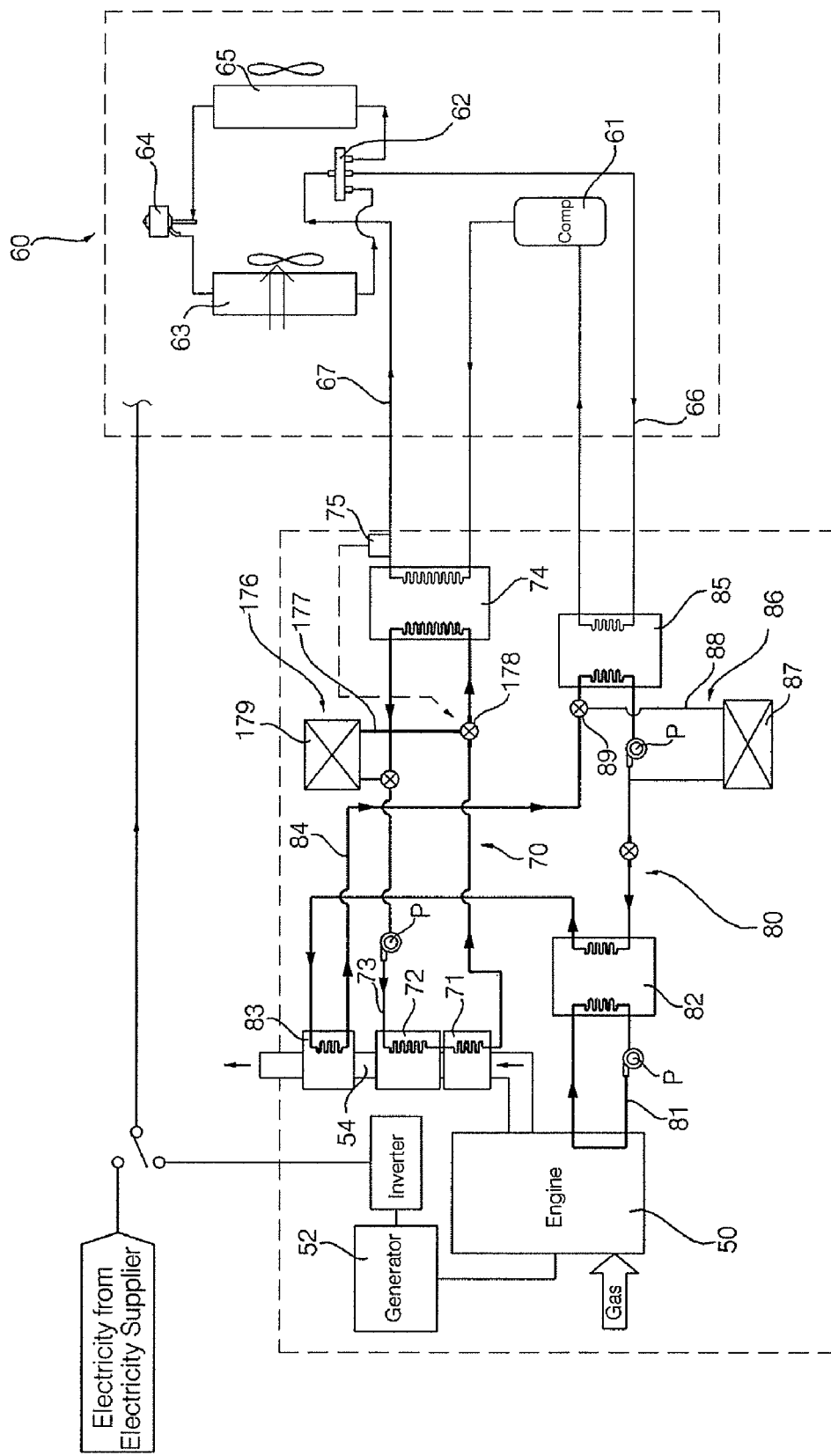
FIG. 7 is a schematic configuration diagram illustrating a cooling/heating apparatus using a cogeneration system according to another exemplary embodiment of the present invention.

The cogeneration system may include a separate bypassing and radiating unit 176 shown in FIG. 7, in place of the bypass unit 76 which is connected to the suction-side refrigerant heating line 84.

In this case, the bypassing and radiating unit 176 includes a bypass line 177 branched from the discharge-side refrigerant heating line 73 at a position upstream from the discharge-side refrigerant heating heat exchanger 74 and joined to the discharge-side refrigerant heating line 73 at a position downstream from the discharge-side refrigerant heating heat exchanger 74, a 3-way valve 178 arranged at the branching or joining point of the bypass line 177, and adapted to adjust the flow rate of the heat transfer medium flowing through the bypass line 177, and a bypass heat exchanger 179 arranged in the bypass line 177, and adapted to outwardly radiate the heat of the heat transfer medium. In the illustrated case, two valve units 178 are arranged at the branching and joining points of the bypass line 177, respectively.

Since the cogeneration system of this embodiment includes several heat exchangers including the first exhaust gas heat exchanger 71, second exhaust gas heat exchanger 72, discharge-side refrigerant heating heat exchanger 74, third exhaust gas heat exchanger 83, cooling water heat exchanger 82, and suction-side refrigerant heating heat exchanger 85, it is possible to operate a water heater or other heat consumers even during a heating operation, by appropriately implementing a water-heating heat exchanger or a water-heating vessel having a heat exchanging function, which receive heat from the above heat exchangers, in accordance with the given design condition.

For reference, reference character P in FIG. 2 designates pumps, each serving to force the heat transfer medium to flow through an associated line.

Operation of the cogeneration system having the above-described configuration according to the illustrated embodiment of the present invention will now be described.

Figure 3:
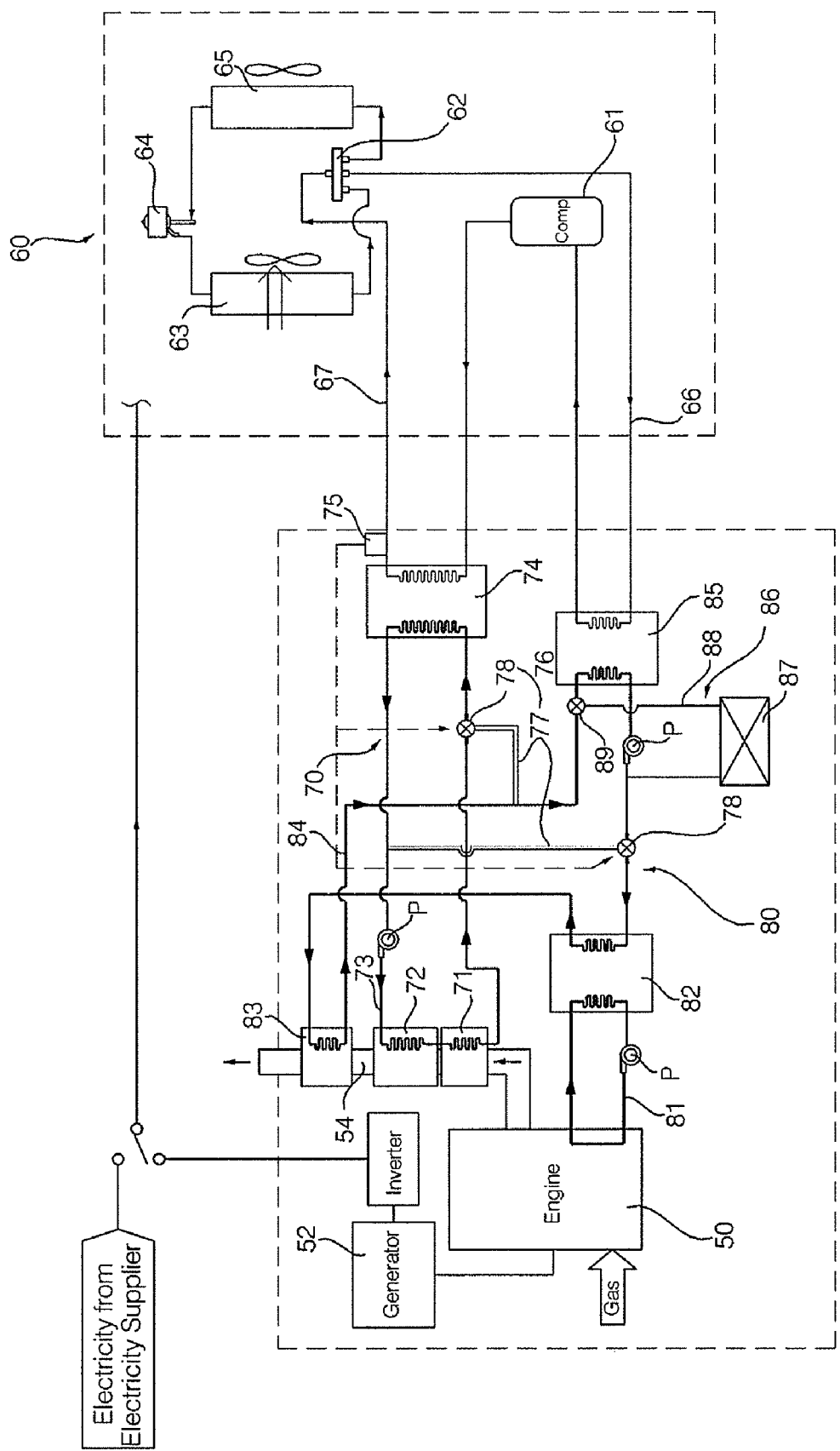
FIG. 3 is a schematic configuration diagram illustrating a state in which the cogeneration system according to the embodiment of the present invention operates under a normal condition.
Figure 4:
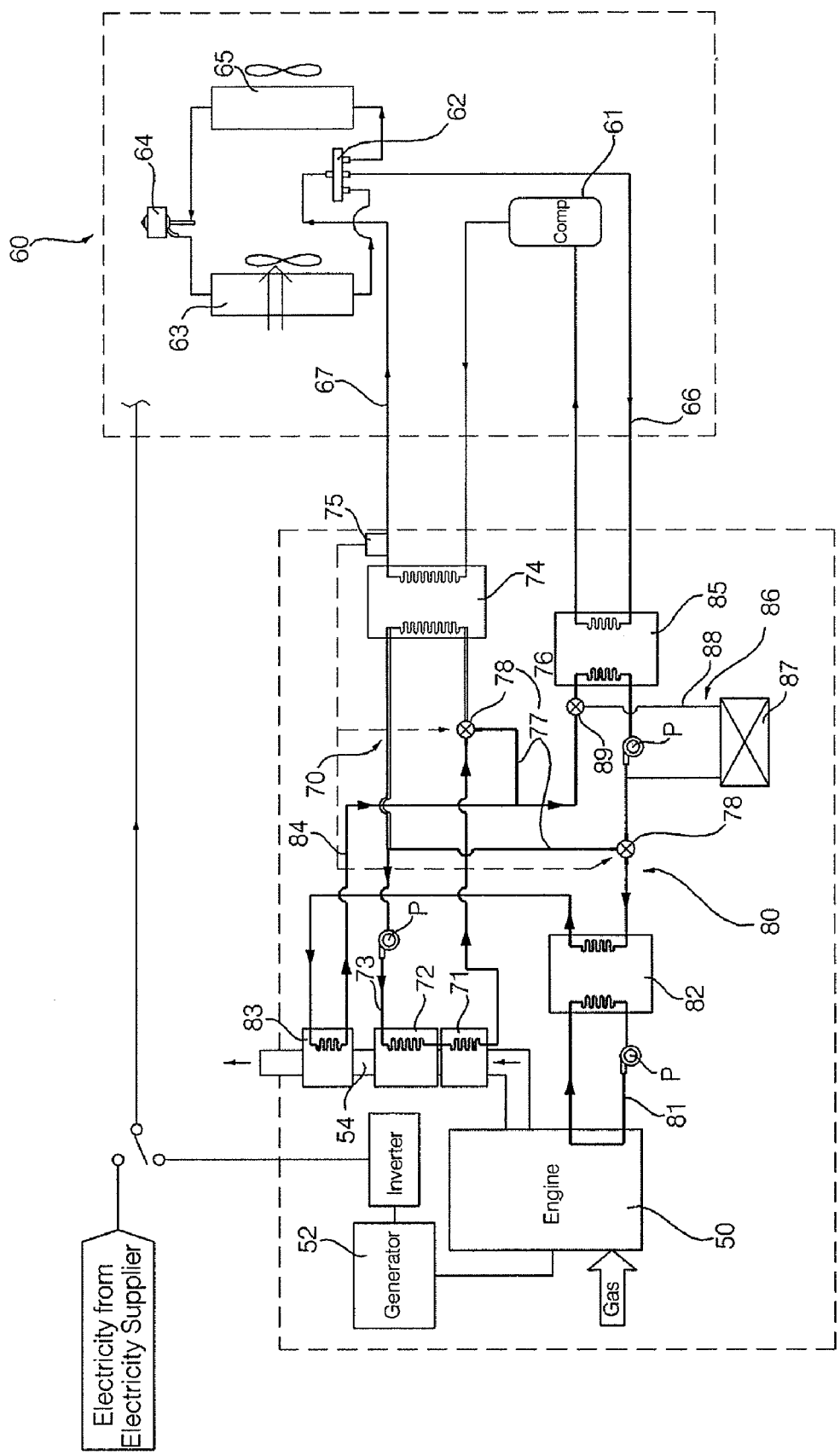
FIG. 4 is a schematic configuration diagram illustrating a state in which the cogeneration system according to the embodiment of the present invention operates under a refrigerant overheating condition.

FIG. 3 is a schematic configuration diagram illustrating a state in which the cogeneration system according to the illustrated embodiment of the present invention operates under a normal condition. FIG. 4 is a schematic configuration diagram illustrating a state in which the cogeneration system according to the illustrated embodiment of the present invention operates under a refrigerant overheating condition.

Electricity generated in the cogeneration system using a drive force from the engine 50 may be used in elements requiring electricity such as the compressor 61 of the cooling/heating unit 60 and controllers.

In the cooling/heating unit 60, a heating operation is carried out as the refrigerant is circulated through the compressor 61, 4-way valve 62, indoor heat exchanger 65, expansion device 64, and outdoor heat exchanger 63, in this order.

The refrigerant to be introduced into the compressor 61 via the suction-side refrigerant line 66 is pre-heated by the heat of the cooling water used to cool the engine 50 and the heat of the exhaust gas generated from the engine 50. The pre-heated refrigerant is then introduced into the compressor 61.

The cooling water heat and exhaust gas heat are transferred to the suction-side refrigerant heating heat exchanger 85 via the cooling water heat exchanger 82 and third exhaust gas heat exchanger 83, respectively.

The refrigerant discharged from the compressor 61 through the discharge-side refrigerant line 67 is heated while passing through the discharge-side heating heat exchanger 74. The heated refrigerant is then introduced into the indoor heat exchanger 65.

Thus, the refrigerant is pre-heated using the waste heat of the engine 50 at the suction and discharge sides of the compressor 61, so that the refrigerant is introduced into the indoor heat exchanger 65 serving as a condenser, in a state of being maintained at a more or less increased temperature. Accordingly, heat of a higher temperature can be supplied to the room, so that it is possible to achieve an enhancement in heating performance.

Also, the suction side of the compressor 61 uses the cooling water heat and the third exhaust gas heat, which exhibit a temperature lower than that of the primary exhaust gas heat and secondary exhaust gas heat supplied to the discharge side of the compressor 61. Accordingly, it is possible to prevent the refrigerant from being excessively increased in temperature, and thus, to prevent the compressor 61 from being excessively heated. On the other hand, the refrigerant passing through the discharge side of the compressor 61 absorbs heat of a relatively high temperature through the discharge-side refrigerant heating heat exchanger 74, and is then introduced into the indoor heat exchanger 65. Accordingly, it is possible to prevent the compressor 61 from being damaged due to an excessive pressure increase thereof.

In particular, the flow path of the heat transfer medium is switched between the discharge-side refrigerant heating line 73 and the suction-side refrigerant heating line 84.

That is, when the refrigerant temperature sensed by the discharge-side refrigerant temperature sensor 75 is not lower than the predetermined temperature, the flow path of the heat transfer medium is switched to the bypass line 77 through the valve unit 78, as shown in FIG. 4. In this case, accordingly, the heat transfer medium flowing through the discharge-side refrigerant heating line 73 is bypassed to the suction-side refrigerant heating line 84 via the bypass line 77 without flowing through the discharge-side refrigerant heating heat exchanger 74. Thus, it is possible to prevent the refrigerant from being degraded due to an excessive increase in the temperature thereof.

Of course, the temperature of the refrigerant discharged from the compressor 61 may be adjusted by controlling the flow rate of the heat transfer medium flowing through the discharge-side refrigerant heating heat exchanger 74 by the valve unit 78. Also, it is possible to heat the refrigerant to be introduced into the compressor 61 by applying the exhaust gas heat supplied through the discharge-side refrigerant heating line 73 to the suction-side refrigerant heating heat exchanger 85.

When it is also desired to prevent the engine cooling water heat and exhaust gas heat from being supplied to the suction-side refrigerant heating heat exchanger 85 or to adjust the amount of the engine cooling water heat and exhaust gas heat to be supplied to the suction-side refrigerant heating heat exchanger 85, this can be achieved using the 3-way valve 89 of the radiating unit 86. That is, an appropriate amount of the engine cooling water heat and exhaust gas heat can be outwardly radiated using the 3-way valve 89.

When the flow path defined in the 3-way valve 89 of the radiating unit 86 is switched to the radiating line 88 under the condition in which the heat transfer medium flowing through the discharge-side refrigerant heating line 73 is bypassed to the suction-side refrigerant heating line 84 via the bypass line 77, the heat transfer medium is allowed to outwardly radiate heat while passing through the radiating line 88 and radiating heat exchanger 87, and is then circulated through the suction-side refrigerant heating line 84. Accordingly, it is possible to adjust the amount of heat transferred to the discharge-side refrigerant heating heat exchanger 74 and suction-side refrigerant heating heat exchanger 74.

Thus, it is possible to perform a radiating function for the overall part of the system using the radiating unit 86 which is installed in only one of the discharge-side refrigerant heating unit 70 and suction-side refrigerant heating unit 80.

Meanwhile, the heat of the exhaust gas generated from the engine 50 and the heat of the cooling water used to cool the engine 50 are prevented from being supplied to the cooling/heating unit 60 during the cooling operation of the cooling/heating unit 60 or under the condition in which the cooling/heating unit 60 stops the cooling or heating operation. This is achieved by switching the valve unit 78 and 3-way valve 89. In this state, the waste heat of the engine 50 is supplied to neither the discharge-side refrigerant heating heat exchanger 74 nor the suction-side refrigerant heating heat exchanger 85, so that the refrigerant is circulated through the refrigerant cycle under the condition in which the refrigerant is maintained at a normal temperature. Thus, the cooling operation is normally carried out in this state.

Figure 5:
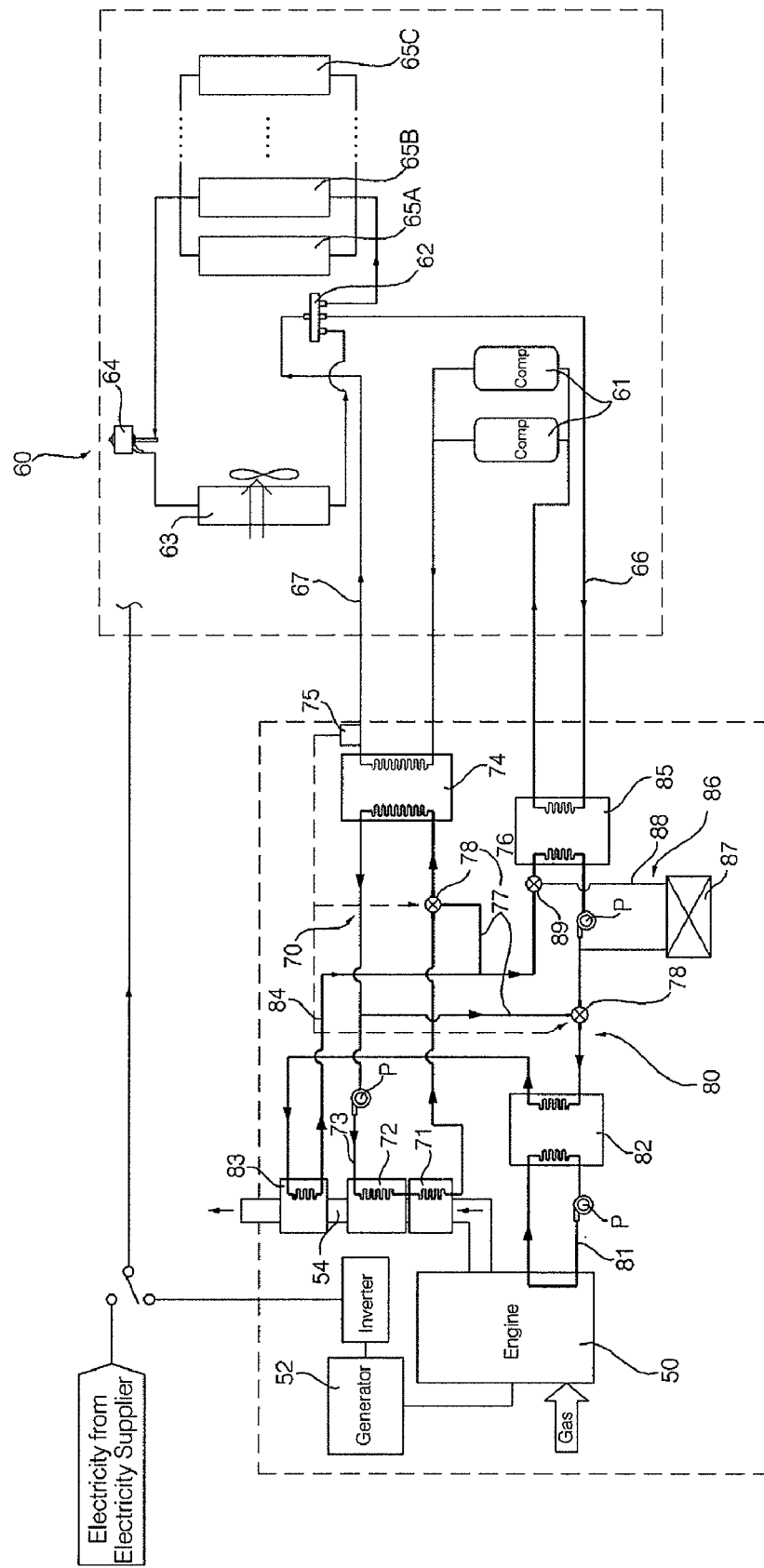
FIG. 5 is a schematic configuration diagram illustrating a cooling/heating apparatus using a cogeneration system according to another exemplary embodiment of the present invention in which a plurality of indoor heat exchangers are used.

On the other hand, FIG. 5 is a schematic configuration diagram illustrating a cooling/heating apparatus using a cogeneration system according to another exemplary embodiment of the present invention in which a plurality of indoor heat exchangers are used. In this case, a plurality of indoor heat exchangers 65A, 65B, and 65C are arranged in serial or parallel in a single cooling/heating unit 60 to cool/heat a plurality of confined spaces, respectively.

Constituent elements of the configuration shown in FIG. 5 are identical to those of the configuration shown in FIG. 2. Accordingly, these constituent elements are designated by the same reference numerals as those of FIG. 2, respectively, and no description thereof will be given. Similarly, constituent elements of the configuration of FIG. 6, which will be described hereinafter, corresponding to those of FIG. 2 are designated by the same reference numerals, respectively, and no description thereof will be given.

Figure 6:
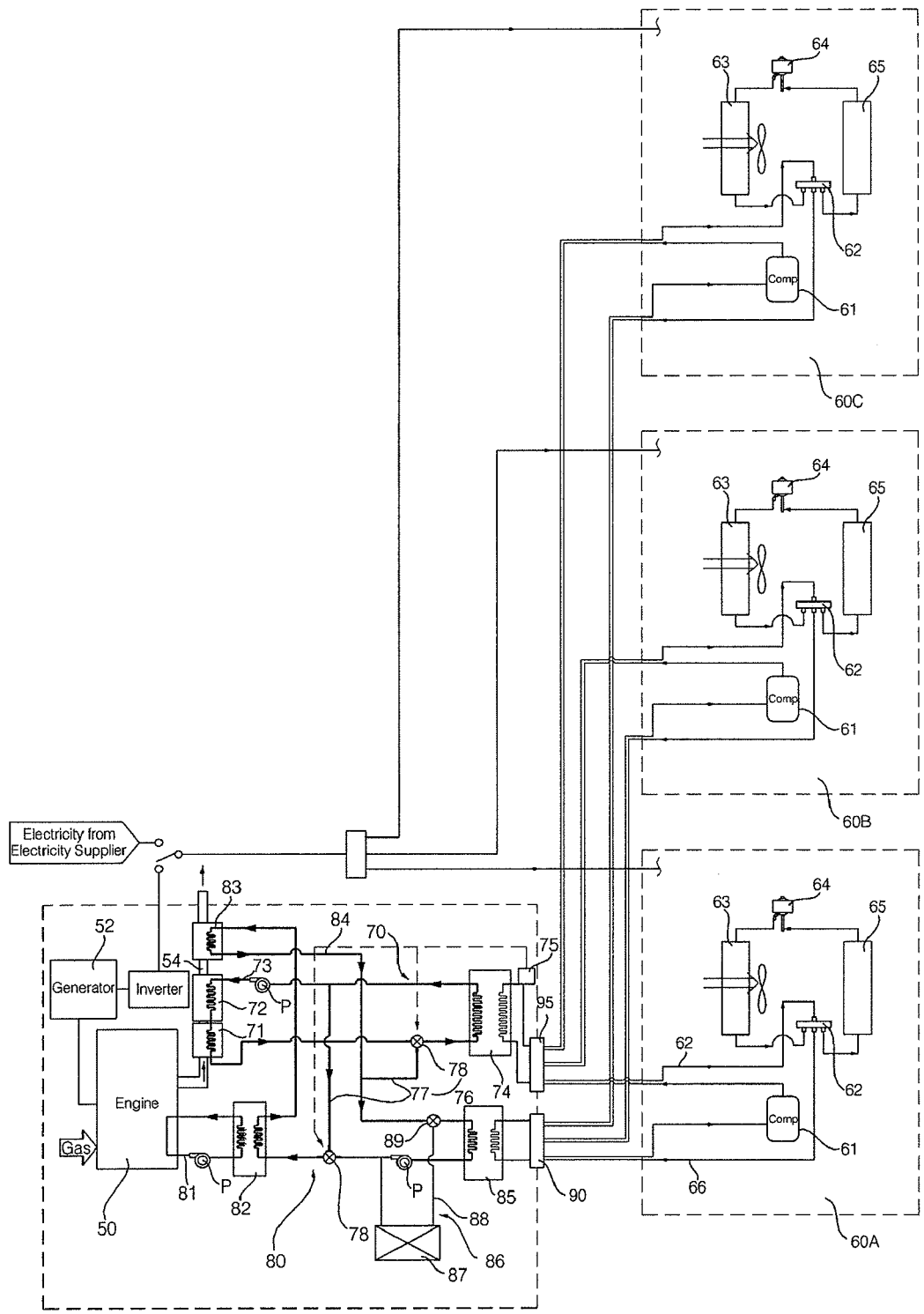
FIG. 6 is a schematic configuration diagram illustrating a cooling/heating apparatus using a cogeneration system according to another exemplary embodiment of the present invention in which a plurality of cooling/heating units are used.

FIG. 6 is a schematic configuration diagram illustrating a cooling/heating apparatus using a cogeneration system according to another exemplary embodiment of the present invention in which a plurality of cooling/heating units are used. In this case, distributors 90 and 95 are arranged at suction-side and discharge-side refrigerant lines 66 and 67, respectively, to distribute heat to a plurality of cooling/heating units 60A, 60B, and 60C.

Meanwhile, the above-described heat exchangers may have various heat transfer configurations, for example, a heat transfer configuration in which heat transfer is carried out through a thermal conductor, or a heat transfer configuration in which heat transfer is carried out through a fluid present in a heat exchanger, in accordance with the given design condition or the given requirement.

As apparent from the above description, the cooling/heating apparatus using the cogeneration system according to the present invention is configured to appropriately distribute heat of exhaust gas generated from an engine and heat of cooling water to both the suction and discharge sides of the compressor during the heating operation, thereby achieving an enhancement in heating performance and an enhancement in system efficiency.

Also, in accordance with the present invention, the amount of heat supplied to the suction and discharge sides of the compressor is appropriately controlled using the bypass unit and radiating unit. Accordingly, it is possible to simplify the radiating structure of the system. In addition, since the refrigerant is appropriately heated, it is possible to prevent the refrigerant from being degraded.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A cooling/heating apparatus using a cogeneration system comprising:
  an engine which drives a generator to generate electricity;
  a cooling/heating unit which comprises at least one compressor, a 4-way valve, an outdoor heat exchanger, an expansion device, and an indoor heat exchanger, to establish a heat pump refrigerant cycle;
  a discharge-side refrigerant heating unit which supplies heat of exhaust gas generated from the engine to a discharge-side refrigerant line connected to the compressor;
  a discharge-side refrigerant temperature sensor which senses a temperature of a refrigerant passing through the discharge-side refrigerant line;
  a bypass unit which bypasses the exhaust gas heat supplied to the discharge-side refrigerant line via the discharge-side refrigerant heating unit when the refrigerant temperature sensed by the discharge-side refrigerant temperature sensor is not lower than a predetermined temperature, to cut off the supply of the exhaust gas heat or to adjust an amount of the supplied exhaust gas heat; and
  a suction-side refrigerant heating unit which supplies heat of cooling water used to cool the engine and the heat of the exhaust gas generated from the engine to a suction-side refrigerant line connected to the compressor.

2. The cooling/heating apparatus according to claim 1, wherein the discharge-side refrigerant heating unit comprises:
  at least one exhaust gas heat exchanger arranged in an exhaust conduit of the engine, to heat-exchange with the exhaust gas flowing through the exhaust conduit;
  a discharge-side refrigerant heating line which receives heat recovered from the exhaust gas heat exchanger; and
  a discharge-side refrigerant heating heat exchanger in which heat exchange is performed between the discharge-side refrigerant heating line and the discharge-side refrigerant line.

3. The cooling/heating apparatus according to claim 2, wherein the at least one exhaust gas heat exchanger comprises:
  a first exhaust gas heat exchanger arranged in the exhaust conduit of the engine; and a second exhaust gas heat exchanger arranged in the exhaust conduit of the engine downstream from the first exhaust gas heat exchanger in a flowing direction of the exhaust gas.

4. The cooling/heating apparatus according to claim 1, wherein the suction-side refrigerant heating unit comprises:
  a third exhaust gas heat exchanger arranged in the exhaust conduit of the engine, to heat-exchange with the exhaust gas flowing through the exhaust conduit;
  a cooling water line through which the cooling water flows to absorb heat from the engine;
  a cooling water heat exchanger through which the cooling water line extends;
  a suction-side refrigerant heating line which receives heat recovered by the third exhaust gas heat exchanger and the cooling water heat exchanger; and a suction-side refrigerant heating heat exchanger in which heat exchange is performed between the suction-side refrigerant heating line and the suction-side refrigerant line.

5. The cooling/heating apparatus according to claim 4, wherein the bypass unit bypasses the exhaust gas heat through the suction-side refrigerant heating line of the suction-side refrigerant heating unit.

6. The cooling/heating apparatus according to claim 5, wherein the bypass unit comprises:
a bypass line branched from the discharge-side refrigerant heating line and joined to the suction-side refrigerant heating line; and
a valve unit arranged at the branching or joining point of the bypass line, to adjust a flow rate of a heat transfer medium flowing through the bypass line in accordance with the refrigerant temperature sensed by the discharge-side refrigerant temperature sensor.

7. The cooling/heating apparatus according to claim 4, further comprising:
a radiating unit connected to the suction-side refrigerant heating unit, to adjust an amount of heat supplied to the suction-side refrigerant line or to cut off the supply of the heat.

8. A cooling/heating apparatus using a cogeneration system comprising:
an engine which drives a generator to generate electricity;
a cooling/heating unit which comprises at least one compressor, a 4-way valve, an outdoor heat exchanger, an expansion device, and an indoor heat exchanger, to establish a heat pump refrigerant cycle;
a discharge-side refrigerant heating unit which supplies heat of exhaust gas generated from the engine to a discharge-side refrigerant line connected to the compressor;
a suction-side refrigerant heating unit which supplies heat of cooling water used to cool the engine and the heat of the exhaust gas generated from the engine to a suction-side refrigerant line connected to the compressor;
a discharge-side refrigerant temperature sensor which senses a temperature of a refrigerant passing through the discharge-side refrigerant line; and
a bypass unit which bypasses the exhaust gas heat supplied to the discharge-side refrigerant line via the discharge-side refrigerant heating unit when the refrigerant temperature sensed by the discharge-side refrigerant temperature sensor is not lower than a predetermined temperature, to cut off the supply of the exhaust gas heat or to adjust an amount of the supplied exhaust gas heat, wherein:
the discharge-side refrigerant heating unit comprises a first exhaust gas heat exchanger arranged in the exhaust conduit of the engine, to heat-exchange with the exhaust gas flowing through the exhaust conduit, and a second exhaust gas heat exchanger arranged in the exhaust conduit of the engine downstream from the first exhaust gas heat exchanger in a flowing direction of the exhaust gas, to heat-exchange with the exhaust gas flowing through the exhaust conduit; and
the suction-side refrigerant heating unit comprises a third exhaust gas heat exchanger arranged in the exhaust conduit of the engine downstream from the second exhaust gas heat exchanger in the flowing direction of the exhaust gas, to heat-exchange with the exhaust gas flowing through the exhaust conduit.

9. The heating/cooling apparatus according to claim 8, wherein the bypass unit comprises:
a bypass line branched from a heat transfer line of the discharge-side refrigerant heating unit and joined to a heat transfer line of the suction-side refrigerant heating unit; and
a valve unit arranged at the branching or joining point of the bypass line, to adjust a flow rate of a heat transfer medium flowing through the bypass line in accordance with the refrigerant temperature sensed by the discharge-side refrigerant temperature sensor.

10. The cooling/heating apparatus according to claim 8, further comprising:
a radiating unit connected to the suction-side refrigerant heating unit, to adjust an amount of heat supplied to the suction-side refrigerant line or to cut off the supply of the heat.

11. A cooling/heating apparatus using a cogeneration system comprising:
an engine which drives a generator to generate electricity;
a cooling/heating unit which comprises at least one compressor, a 4-way valve, an outdoor heat exchanger, an expansion device, and an indoor heat exchanger, to establish a heat pump refrigerant cycle;
a discharge-side refrigerant heating unit and a suction-side refrigerant heating unit which supply heat of exhaust gas generated from the engine to a discharge-side refrigerant line connected to the compressor and a suction-side refrigerant line connected to the compressor, respectively; and
a bypass unit which adjusts an amount of the exhaust gas heat supplied to the discharge-side refrigerant line through the discharge-side refrigerant heating unit in accordance with a temperature of a refrigerant passing through the discharge-side refrigerant line,
wherein the suction-side refrigerant heating unit comprises;
a third exhaust gas heat exchanger arranged in the exhaust conduit of the engine, to heat-exchange with the exhaust gas flowing through the exhaust conduit;
a cooling water line through which the cooling water flows to absorb heat from the engine;
a cooling water heat exchanger through which the cooling water line extends;
a suction-side refrigerant heating line which receives heat recovered by the third exhaust gas heat exchanger and the cooling water heat exchanger; and
a suction-side refrigerant heating heat exchanger in which heat exchange is performed between the suction-side refrigerant heating line and the suction-side refrigerant line.

12. The cooling/heating apparatus according to claim 11, wherein the discharge-side refrigerant heating unit comprises:
at least one exhaust gas heat exchanger arranged in an exhaust conduit of the engine, to heat-exchange with the exhaust gas flowing through the exhaust conduit;
a discharge-side refrigerant heating line which receives heat recovered from the exhaust gas heat exchanger; and
a discharge-side refrigerant heating heat exchanger in which heat exchange is performed between the discharge-side refrigerant heating line and the discharge-side refrigerant line.

13. The cooling/heating apparatus according to claim 12, wherein the at least one exhaust gas heat exchanger comprises:
a first exhaust gas heat exchanger arranged in the exhaust conduit of the engine; and a second exhaust gas heat exchanger arranged in the exhaust conduit of the engine downstream from the first exhaust gas heat exchanger in a flowing direction of the exhaust gas.

14. The cooling/heating apparatus according to claim 11, wherein the bypass unit bypasses the exhaust gas heat through the suction-side refrigerant heating line of the suction-side refrigerant heating unit.

15. The cooling/heating apparatus according to claim 11, further comprising:
a radiating unit connected to the suction-side refrigerant heating unit, to adjust an amount of heat supplied to the suction-side refrigerant line or to cut off the supply of the heat.

* * * * *